Dec. 23, 1958 T. E. LINNELL ET AL 2,865,278
SMOKING OR OTHER TREATMENT OF BACON AND THE LIKE
Filed April 12, 1956
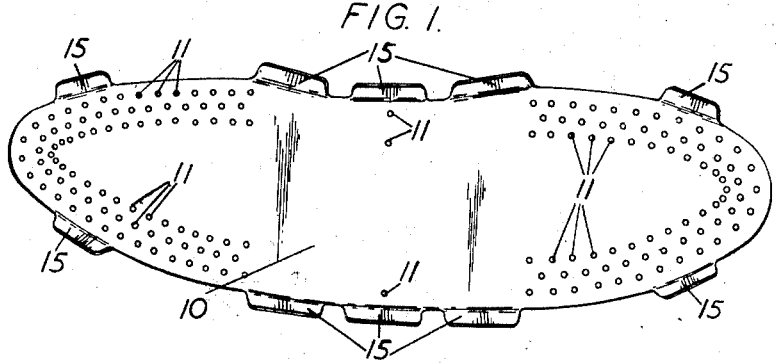
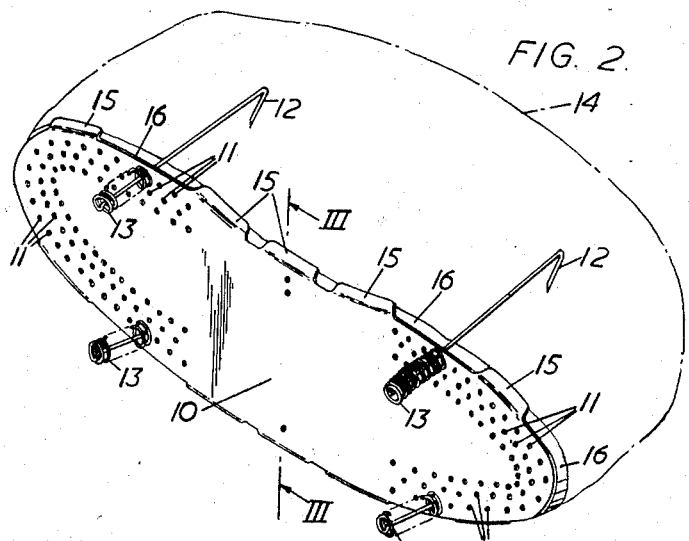
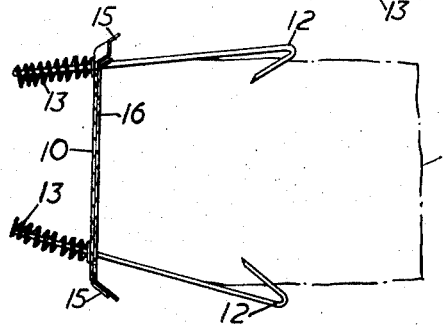
T. E. LINNELL
P. R. LINNELL
Inventors
By
Attorney

United States Patent Office 2,865,278
Patented Dec. 23, 1958

2,865,278

SMOKING OR OTHER TREATMENT OF BACON AND THE LIKE

Timothy Edward Linnell and Peter Robert Linnell, Northampton, England, assignors of one-half to Raymond Eddie Linnell and Thomas Richard Linnell, both of Northampton, England Application April 12, 1956, Serial No. 577,864

Claims priority, application Great Britain April 14, 1955

2 Claims. (Cl. 99—234)

This invention relates to the smoking or other treatment of bacon and the like.

It has been found in practice that bacon and dried or other meats or perishable foodstuffs or commodities often have a surface which is liable to deteriorate in condition or in appearance or in taste or texture as a result of exposure to processing conditions or treatments or by exposure to the atmosphere or to light.

A convenient way of smoking bacon is to hang up a complete side, including the gammon and the fore end or shoulder, in the smoke. This is not always possible, because the demand for green cuts such as green gammons, green fore ends or shoulders or any other green cuts, will leave the remainder of the side to be smoked with an exposed cut face or faces.

Furthermore when bacon is exposed in shops the cut face deteriorates in appearance and may need to have a slice cut from it which may have to be sold at a reduced price.

Bacon may also deteriorate in a similar way in pale drying processes.

The object of this invention is to provide means whereby this deterioration, with its associated loss and waste, may be prevented.

The invention consists in fitting a protector member or members to that portion or portions of the surface of a commodity which has been cut or is otherwise rendered liable to deterioration if not specially treated, the protector member or members being anchored tightly to the commodity.

As applied to the smoking or pale drying of bacon the invention consists in cutting off the gammon or fore end or shoulder or whatever cuts are required to remain in the green state, fitting a protector member or plate to the exposed cut surface or to each such cut surface of the part to be treated, and anchoring the protector or protectors tightly to the bacon so that when the bacon is hung up for treatment, the protector or protectors will remain in intimate contact with the cut face or faces.

In this way deterioration of the face or faces by the action of the smoke will be avoided, and a substantially flat surface will be preserved ready for immediate slicing.

The invention will be further described with reference to the accompanying drawings in which:

Figure 1 is an elevation showing one of the protector members.

Figure 2 is a perspective view showing the protector member fixed in position upon a piece of bacon or the like.

Figure 3 is a section on line III—III of Figure 2.

The protector is in the form of a plate 10 of any suitable size and shape according to the use to which it is to be put. These plates may be made of any suitable material, for instance, metal, glass or porcelain or similar ceramic material, or a plastic. Each plate is provided with holes 11, which as shown are around the marginal parts of the plate although they may be in other positions. Through the holes 11 finger hooks 12 are inserted, the hooks incorporating springs 13 which draw the plate 10 tightly against the surface which it is intended to protect when the hooks 12 are impaled in the meat 14. The springs as shown are coil springs projecting on the external surface of the plate 10, so that the springs are compressed when the plate is secured in position. The springs and hooks are thus formed out of single lengths of wire. Obviously any other form of spring hook may be devised, or the spring action may be derived only from the flexibility of the plates themselves. The plate illustrated is provided with marginal lips or flanges 15, but these are not essential. In some cases the plates may need to be recessed or cut away to allow for the passage of cords or the like by which the commodity is suspended for processing. The plate is shown flat but may be slightly concave or have a contour specially shaped to suit the contour of the commodity with which it is to be used. Moreover the plate illustrated is in one piece but sometimes it may be convenient to employ a plate made in two or more pieces suitably located or connected together, for instance by hinging. Between the surface of the plate and the surface of the commodity a protective tissue or film 16 is interposed, which may be of paper or other material. This is very desirable to protect the commodity from deterioration through the holes 11. In some cases the lips or flanges 15 may be made to penetrate the surface of the commodity to provide a better seal, for instance a continuous flange might be used for this purpose, but it will usually be broken away at intervals as illustrated to retain flexibility in the plate; it need not necessarily be at the extreme edge of the plate.

In some cases, for instance where goods are cut for display or sale, there may be two or more cut faces, and in case of faces which are nearly opposite these could be protected by two plates held in contact with their respective faces by connecting springs attached to both plates.

In another arrangement a fixed plate, for instance in window or counter display, may have more than one commodity fastened to it by spring means. Here again if there are other cut faces on the commodities these can be similarly protected by a further plate or plates.

The plates may even form part of a wrapping or container in which the goods are packaged. In this case, as well as in others, it might be desirable to form the plates of transparent or translucent material.

The plate shown in the drawings is shaped and provided with holes so that two similar plates oppositely flanged will serve for the two opposite sides of bacon (left and right hand of the pig) and for various sizes and lesser cuts, the hooks being passed through holes in whatever positions may be convenient for the particular cut; obviously any number of hooks may be used, and the springs may be of varying strengths, or the hooks of varying sizes.

What we claim as new and desire to protect by Letters Patent of the United States of America is:

1. In a device for protecting an edible commodity against deterioration through its surface, a plate adapted to be fitted in intimate contact with the surface, the plate having a plurality of marginally placed holes therethrough and a plurality of fastening members slidably extending through said holes at spaced apart intervals, each member comprising a stem of substantial length extending through a selected one of said holes and having at one end a hook anchorable in said commodity and at the other end a coiled spring bearing against the external surface of the plate.

2. A device according to claim 1 in which the hook is formed integrally with the stem and the coiled spring is formed integrally with the stem by coiling the end of the stem back upon itself around said stem.

References Cited in the file of this patent

UNITED STATES PATENTS

| | | |
|---|---|---|
| 170,223 | Black | Nov. 23, 1875 |
| 787,021 | Biber | Apr. 11, 1905 |
| 2,070,829 | Everly | Feb. 16, 1937 |
| 2,415,583 | Eddy | Feb. 11, 1947 |
| 2,546,800 | Thiac et al. | Mar. 27, 1951 |

FOREIGN PATENTS

| | | |
|---|---|---|
| 523,088 | Great Britain | July 4, 1940 |